United States Patent [19]

Kimura

[11] 3,762,136
[45] Oct. 2, 1973

[54] PREPARATION OF ASYMMETRIC POLYMER MEMBRANES

[75] Inventor: Shiro G. Kimura, Schenectady, N.Y.

[73] Assignee: General Electric Company, Schenectady, N.Y.

[22] Filed: July 1, 1971

[21] Appl. No.: 158,979

Related U.S. Application Data

[62] Division of Ser. No. 36,923, May 13, 1970, Pat. No. 3,709,774.

[52] U.S. Cl. .................................................. 55/158
[51] Int. Cl. ............................................ B01d 53/22
[58] Field of Search ................... 55/16, 158; 264/41

[56] References Cited
UNITED STATES PATENTS

| 3,350,844 | 11/1967 | Robb | 55/16 |
|---|---|---|---|
| 3,567,810 | 3/1971 | Baker | 264/41 |
| 3,567,666 | 3/1971 | Berger | 55/158 |
| 3,615,024 | 10/1971 | Michaels | 210/490 |

Primary Examiner—Charles N. Hart
Attorney—John F. Ahern et al.

[57] ABSTRACT

A method is disclosed for the preparation (by the utilization of a proper solvent system) of dry asymmetric membranes comprising a porous layer of interconnected crystals of polymer material. Membranes of many polymer materials may be optionally prepared either with or without a dense surface layer as one face thereof. In either case the porous layer is structured with graded porosity. A three-component casting solution is prepared containing the polymer, a first good volatile solvent for the polymer and (relative to the first solvent) a poor less-volatile solvent for the polymer, which is miscible with the good solvent. A membrane is cast, allowed to desolvate for a short time and is then immersed in a leaching agent, that is miscible with both the aforementioned solvents but is a non-solvent for the polymer. The membrane is then permitted to dry.

2 Claims, 1 Drawing Figure

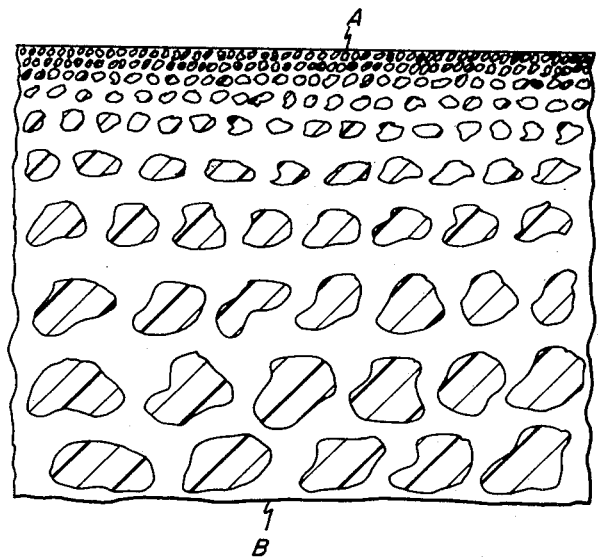

3,762,136

PREPARATION OF ASYMMETRIC POLYMER MEMBRANES

This is a division application of U. S. Pat. application Ser. No. 36,923 — Kimura (now U.S. Pat. No. 3,709,774), filed May 13, 1970, and assigned to the assignee of the instant invention.

BACKGROUND OF THE INVENTION

Cellulose acetate reverse osmosis membranes are produced by the practice of such inventions as are described in U. S. Pat. No. 3,133,132 — Loeb et al.; U. S. Pat. No. 3,432,585 — Watson et al. and U. S. Pat. No. 3,344,214 — Manjikian et al.

Although it is reported in the literature that the structure of the cellulose acetate appears to be a composite of a very thin dense membrane and a thicker integral porous support substructure, it is recognized by those skilled in the art that the porous region actually displays graded porosity (the effective diameter of the pores decreases in traversing the membrane in the direction of the dense skin). The article "Preparation of Ultrathin Reverse Osmosis Membranes and the Attainment of Theoretical Salt Rejection" by Riley et al (Journal of Applied Polymer Science, Vol. 11, pages 2143–2158, 1967) reports an electron microscope study of the structure of such membranes in which it was found that the dense layer of cellulose acetate is about 0.2 microns in thickness and the porous layer is formed integral therewith.

An improvement in the aforementioned method is described in the article "Drying Cellulose Acetate Reverse Osmosis Membranes" by Vos et al. (Industrial Engineering Chemistry — Prod. Res. Develop., 8(1), pp. 84–89, 1969) to overcome a problem also referred to in the aforementioned patents. As stated in Vos et al, if such membranes are allowed to dry without taking special precautions, they suffer a non-recoverable loss in desalination and physical properties. The Vos et al. method for overcoming this problem prescribes soaking the membrane in a surface active agent. Thereafter, the membrane may be permitted to dry out without deleterious effect.

With respect to dry asymmetrical porous polymer structures, without any dense surface layer, cellulose acetate membranes may be prepared without annealing and drying using the Vos et al. technique. This is the only known polymer material of which such dry membranes have been prepared. Metal porous layers, that approximate an asymmetric porous structure are disclosed in U. S. Pat. No. 3,303,055 — Gumucio wherein a multilayer metal electrode construction is disclosed in which each succeeding layer presents a change in porosity. In preparing the multilayer structure, layers of particulate material are built up in the mold using different particle size material for each of the various layers. The layers of particulate material are then sintered to prepare an integral unit. This porous structure is made of metal, rather than polymer, and must have pores of relatively large dimension since this would be a characteristic inherent from the method of manufacture.

A number of methods have been disclosed for the preparation of porous polymers, however, none of these methods produce an asymmetric structure. U. S. Pat. No. 3,378,507 — Sargent et al. reviews much of the patent art relating to the preparation of porous polymer structures and is incorporated herein by reference.

The art is in need of a method for the preparation of asymmetric membranes of various crystalline polymer materials both with and without the dense skin characteristic of the cellulose acetate membranes. Further, the gas separation art is particularly in need of integral structures of this type able to present very thin nonporous layers of various polymers for perm-selective gas separation of high efficiency.

SUMMARY OF THE INVENTION

An asymmetric microporous polymer membrane structure is produced by this invention having a graded porosity, i.e. graded pore size progressing from one major surface of the membrane to the other major surface thereof. The structure will (depending upon the conduct of the process) present porosity thereof as graded interconnected pores either (a) ranging from an effective diameter of about 100 A at one membrane face to a smaller undetermined size adjacent a dense layer forming the second face or (b) ranging from an effective diameter of about 100 A at one membrane face to some very small finite value at the opposite face of the membrane through which gas can freely pass.

The method of this invention for the preparation of such membranes involves purely physical phenomena beginning with the selection of a polymer, which can be cast in a crystalline form and is soluble to different degrees in two mutually miscible solvents. The better of the two solvents for the polymer must be more volatile than the poorer of the two solvents. Next, a leaching agent is selected having the properties of being miscible with both the mutually miscible solvents and being a non-solvent for the polymer.

The method steps involve preparing a solution of the polymer in the better solvent and then adding to this solution a quantity ranging from about 10 to about 50 percent by volume (of the first solution) of the poorer solvent to prepare the casting solution. A membrane is cast from this polymer solution and is allowed to desolvate for a short time before immersion thereof into the leaching agent. Immersion time should be long enough for the membrane structure to develop; that is, of the order of 1 minute or longer. After the immersion the membrane is dried.

With many polymers that exhibit crystallinity it is possible, depending upon the desolvation time employed, to produce either an asymmetric microporous membrane having one thin dense major surface (or skin) or an asymmetric microporous membrane without such a dense skin.

BRIEF DESCRIPTION OF THE DRAWING

The practice of this invention and the products resulting therefrom will be apparent from the following detailed description and the annexed drawing displaying the graded porosity of the microporous polymer membrane of this invention in cross-section.

DESCRIPTION OF THE PREFERRED EMBODIMENT

It has been unexpectedly found that by characterizing essential features of the prior art methods employed in the preparation of cellulose acetate reverse osmosis membranes in terms of the solvent system employed and utilizing this characterization in connection with polymers other than cellulose acetate, which exhibit crystallinity, that not only is it possible to prepare asymmetric microporous polymer membranes of these materials having a dense thin surface layer but, as well, microporous graded structures without the dense membrane may also be prepared. Surprisingly each such structure may be dried without the necessity of employing a surface active agent to reduce the surface tension of the leaching agent or of employing liquid extraction or freeze-drying as are described in the aforementioned Vos et al article.

Among the thermoplastic polymer materials from which asymmetric microporous membranes may be prepared are the arylene oxide polymers described in U. S. Pat. No. 3,350,844 — Robb (incorporated by reference), polycarbonate resins such as are described in U. S. Pat. No. 3,256,675 — Robb et al. (incorporated by reference), polyvinyl acetate resins, polyalkyl methacrylate resins, polysulfones, polymers of monovinyl aromatic hydrocarbons, etc.

Both types of asymmetric microporous polymer membranes produced by this invention have a number of applications. Thus, the asymmetric membranes having a thin dense major surface are particularly useful in gas separation because the composite membrane presents both (a) an extremely thin non-porous film of the polymer membrane through which gas permeation can be conducted and (b) backing support for this thin membrane integral therewith and eliminating any necessity to handle the very thin polymer film for placement on a separate porous support. Asymmetric microporous membranes prepared without the thin dense surface layer may be used to separate gaseous components from a liquid e.g. in an artificial lung, as battery separators, as support for thin-dip cast polymer membranes, as a filter material, as an immobilizing structure for liquid membranes employed in gas separation or as a component of a composite structure useable to replace leather or fabric.

Once the crystalline polymer from which the membrane is to be prepared has been selected, the solvent system to be employed may be determined in routine fashion. Thus, a volatile (boiling point of about 50° C) solvent able to dissolve at least 15 percent by weight of the polymer is first selected, if available. If such a solvent is not available, a solvent having characteristics of solubility and volatility as close thereto as possible is selected. Next, (as related to this "good" volatile solvent) a poorer solvent for the same polymer, which is (a) less volatile than the good solvent by a factor of at least about 2, and (b) is miscible with the good volatile solvent is selected in order that a casting solution may be prepared containing these three components; namely, the polymer material, the good volatile solvent, and the poor non-volatile solvent.

The characterization of "good" and "poorer" with respect to the aforementioned solvents illustrates a difference in the capability to dissolve polymer ranging from about 2 to about 10 times, e.g. the "good" solvent should be able to dissolve from about 2 to about 10 times the amount of polymer as will dissolve in the "poorer" solvent.

A similar routine method of selection is employed in determining the liquid leaching agent. This material must (a) be miscible with both the good solvent and the poor solvent, but (b) be a non-solvent for the polymer material.

Having selected the polymer, the solvent system and the leaching agent, the procedure for the preparation of the asymmetric microporous membrane is as follows: at least about 10 percent by weight of polymer is dissolved in the good, volatile solvent. A solution is then prepared consisting of about 1 to 9 parts of the polymer solution to 1 part of the poorer, less-volatile solvent. A membrane of this solution is cast upon a flat surface (e.g. a glass plate) in the conventional manner employing a doctor blade with the blade setting ranging from about 5 to 25 mils from the flat surface. The procedure is very straightforward and casting may be accomplished in air at ambient temperatures ranging from about 20° to 30° C. Special atmospheres are not required.

The decision must be made, of course, as to whether or not the asymmetric membrane is to have a dense major surface or not. Having decided which of these structures is desired, the next three steps constitute desolvation (which introduces a variable, desolvation time, in accordance with this selection), immersion in the leaching agent and then drying of the membrane. The desolvation time necessary for production of the desired asymmetric microporous structure is determined in a routine fashion by employing a range of desolvation times for a series of samples and carrying out the remaining process steps with each of the various samples.

Thus, a very short desolvation time, e.g. 5 seconds may suffice for the preparation of an unskinned asymmetric microporous membrane while desolvation times in excess of about several minutes may be required to produce a skinned asymmetric microporous membrane of the same polymer material. The resulting membrane is typically a white, opaque membrane having an area reduced by about 10% from the area of the membrane as cast and having a thickness of about 5 to 25 percent of the membrane as cast.

In the case of the skinned asymmetric microporous membrane, the surface thereof disposed away from the casting surface during the casting operation becomes the dense layer and is slightly more shiny than the opposite major surface. As is shown schematically in the drawing, the membrane consists of discrete crystals held together by some interconnecting mechanism, which is as yet unknown, representing a relatively stiff system defining a structure having a graded porosity in which the effective diameter of the pores increases with distance traversed from face A to face B. The dense non-porous skin of face A may vary from about 100 A. to about 10 microns in thickness.

Because of the crystalline nature of the microporous polymer structure no difficulty has been experienced with problems of cold flow and/or structural collapse as has been stated as being a problem in the preparation of some homogeneous microporous structures. With respect to drying of the membrane this significant crystallinity makes unnecessary any modification of the leaching agent as by the addition of surface active agents.

The change of porosity with distance through the membrane varies for different polymers, different casting solutions, different casting conditions and different desolvation conditions. Also, in the case of skinned asymmetric microporous polymer membranes, the initial thickness of the cast film has an effect on the final product in that for a given desolvation time a thicker initial film as cast will result in a somewhat thinner skin. The series of variables recited provides a capability for simply and controllably determining the end product. Once a given set of conditions is fixed, the results are reproducible.

The variables effect the process and product as follows:

a. Desolvation Time — shortening of the desolvation time reduces the skin thickness and eventually leads to the production of an unskinned microporous membrane while sufficient lengthening of this variable will eventually produce a non-porous skin with many polymers useful in the practice of this invention;

b. Temperature — conduct of the process at lower temperature acts to increase the desolvation time and vice versa;

c. Solvent System — different solvent systems will contribute different desolvation times;

d. Initial Thickness of Cast Film — for a given desolvation time a thicker film as cast results in a thinner (or non-existent) skin.

Suggested solvents and leaching agents for particular polymer materials are, by way of example:

| Polymer | Good Solvent | Poorer Solvent | Leaching Agent |
|---|---|---|---|
| polymethyl methacrylate | acetone | formamide | water |
| polystyrene | acetone | formamide | water |
| copolymer of bisphenol-A and dichlorodiphenyl-sulfone | chloroform | toluene | methanol |

In some instances it is preferable to employ co-solvents as the "good" solvent e.g. when it is necessary to dissolve a polymer, which has both polar and non-polar constituents.

This invention offers particular promise in the preparation of gas separation membranes enabling the production of composite integrated structures having a very thin effective thickness for the permeation medium using less stringent conditions of cleanliness than are necessary, for example, in the solvent casting of ultrathin films. This type of casting of films that are subsequently supported on porous substrates is described and claimed in U. S. Pat. application Ser. No. 763,879 — Ward et al. (Composite Permselective Membrane Structure and Preparation Thereof) filed Sept. 30, 1968, now abandoned and assigned to the assignee of the instant invention.

EXAMPLE 1

A 10 percent solution of polyxylylene oxide in chloroform was prepared, chloroform being the good, volatile solvent. Next, a solution was prepared consisting of 2 parts of the polyxylylene oxide solution to 1 part dichlorobenzene, the poor, non-volatile solvent.

A membrane was cast in air at ambient temperature and pressure on a glass plate using a doctor blade with a blade setting of 10 mils. The cast membrane was allowed to desolvate for 30 seconds and was then immersed in methanol, the leaching agent.

The membrane was dried.

The resultant product was an opaque microporous membrane of about 1.3 mils in thickness. On visual inspection it appears that the side away from the glass plate during casting was slightly shinier than the side toward the glass plate.

On subsequent testing for permeating properties the $O_2$ and $N_2$ permeabilities for the dried membrane were, respectively, $18.5 \times 10^{-9}$ and $4.22 \times 10^{-9}$ (cc gas RTP, cm thick/(sec, sq cm, cm Hg $\Delta P$)).

The permeability values for normal non-porous polyxylylene oxide membranes for $O_2$ and $N_2$ are, respectively, $1.7 \times 10^{-9}$ and $0.35 \times 10^{-9}$ (cc gas RTP, cm thick/(sec, sq cm, cm Hg $\Delta P$))

respectively. A comparison of the above permeability values establishes that the effective thickness of the whole asymmetric polyxylylene oxide membrane was about 2.7 microns, which indicates a skin thickness of 2.7 microns or less. The mathematics of this comparison is as follows:

$$\frac{0.35 \times 10^{-9} | 1.3 \text{ mils} | 25.4}{4.22 \times 10^{-9} | \quad |} = 2.7 \text{ microns}.$$

The oxygen-to-nitrogen permeability ratios for both the membrane prepared in Example 1 and normal non-porous polyxylylene oxide membranes is substantially constant thereby verifying the presence of a non-porous skin.

EXAMPLE 2

Polycarbonate resin was dissolved in methylenechloride to form a 20 wt % solution. The solution is then mixed with toluene in a volume ratio of 2 to 1. The methylenechloride is the good, volatile solvent and the toluene is the poor, non-volatile solvent.

A membrane was doctor blade cast in air (ambient conditions) on a glass plate at a liquid thickness of 20 mils and was allowed to desolvate in air for one minute. The glass plate and membrane were then immersed in methanol and allowed to "gel".

The resultant product was a white, opaque membrane 4 mils thick with a nitrogen permeability of $0.62 \times 10^{-9}$ (cc gas RTP, cm thick)/(sec, sq cm, cm Hg $\Delta P$) and $Pr_{O_2}/Pr_{N_2} = 4.5$. The accepted "dense membrane" values for polycarbonate are $Pr_{N_2} = 0.037 \times 10^{-9}$ and $Pr_{O_2}/Pr_{N_2} = 4.6$. Thus the effective thickness of the 4-mil asymmetric film is calculated to be 0.24 mil. As is indicated in Example 1, this is an indication of the skin thickness. The balance of the membrane was made up of microporous (graded porosity) crystalline structure.

EXAMPLE 3

The same casting solution as in Example 2 was cast but the desolvation time was reduced to 30 seconds. The resultant white, opaque, 4-mil film had a nitrogen permeability of $14.7 \times 10^{-9}$ and $Pr_{O_2}/Pr_{N_2} = 0.92$. The low separation factor indicates that no skin developed, but the asymmetric microporous structure was present.

EXAMPLE 4

A polyvinyl butyrate solution of the following is prepared:

7.5 gm polyvinyl butyrate
8 cc glacial acetic acid
34 cc methyl ethyl ketone (MEK)
7 cc formamide Acetic acid and MEK constitute good co-solvents and formamide is the pore-forming poor solvent. It has been found that casting solutions containing formamide are unstable. Unexpectedly, acetic acid (in addition to its solvent action) acts as a stabilizer for the solution.

Membranes were cast in thicknesses of three mils, desolvated, and gelled in water. The results of subjecting these identical films to different desolvation times are shown in the following table.

| Desolvation time | $Pr_{N_2}$ $\left(\frac{cc.}{cm.^2 sec.}\right)\left(\frac{cm.\ thick}{cm.\ Hg\ \Delta P}\right)$ | $Pr_{O_2}/Pr_{N_2}$ |
| --- | --- | --- |
| 1 min | $15.2 \times 10^{-9}$ | 1.3 |
| 2 min | $5.8 \times 10^{-9}$ | 1.7 |
| 16 min | $2.58 \times 10^{-9}$ | 2.1 |

It is apparent that as desolvation time increases there is an increased degree of skin formation as seen by changes in $Pr_{O_2}/Pr_{N_2}$. However, the desolvation time was not long enough to develop a dense skin on the membrane using this particular solvent system. By way of comparison, a non-porous film of polyvinyl butyrate exhibits values as follows:

$0.077 \times 10^{-9}$ (cc/cm² sec) (cm thick/cm Hg $\Delta P$) for the nitrogen permeability and 2.6 for the $Pr_{O_2}/Pr_{N_2}$.

I claim

1. In an apparatus for altering the composition of a mixture of gases, the apparatus comprising in combination a chamber, a permeable membrane forming at least a portion of the wall area of the chamber and means in communication with the chamber for conducting gas thereto for contact with the chamber side of the permeable membrane, the improvement in said combination comprising the permeable membrane being a dry polyarylene oxide membrane having a porosity increasing progressively from adjacent one major surface of the membrane to the second major surface thereof, the porosity being due to the presence of pores extending through a mass of polymer crystals interconnected in a relatively stiff system, said pores being microporous and interconnected, and the one major surface adjacent the region of lesser porosity alone being in the form of a thin, dense, non-porous skin formed integral with and supported by the porous portion of said membrane, said skin and said porous portion both being polyarylene oxide polymer.

2. The improvement as recited in claim 1 wherein the polyarylene oxide is polyxylylene oxide and the non-porous skin is less than about 3 microns thick.

* * * * *